W. C. GRIMES.
Water and Steam Gage.
No. 20,847.
Patented July 6, 1858.
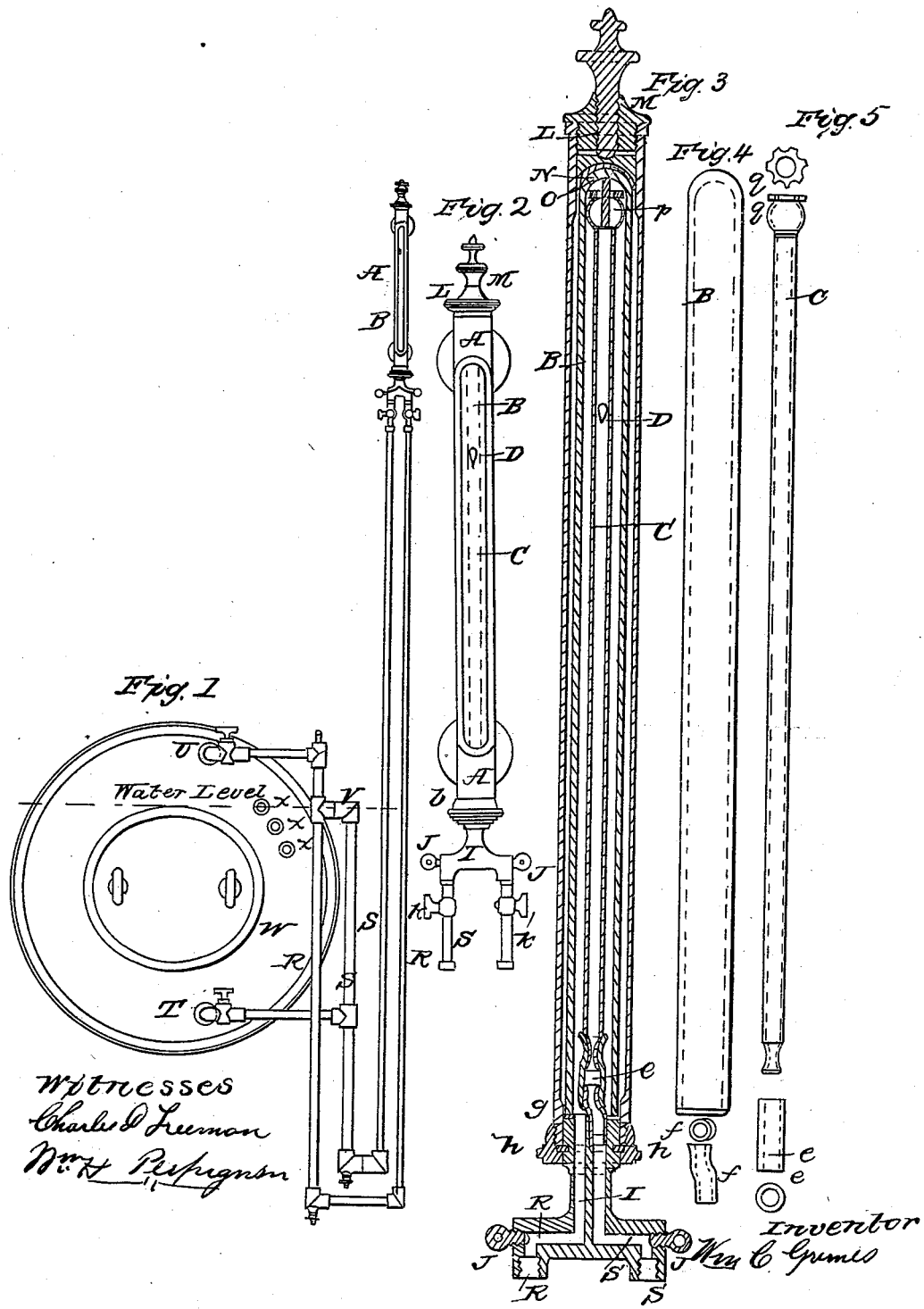

UNITED STATES PATENT OFFICE.

W. C. GRIMES, OF PHILADELPHIA, PENNSYLVANIA, ASSIGNOR TO DAVID MATTHEW, OF SAME PLACE.

WATER AND STEAM INDICATOR.

Specification of Letters Patent No. 20,847, dated July 6, 1858.

*To all whom it may concern:*

Be it known that I, WM. C. GRIMES, of Philadelphia and State of Pennsylvania, have invented a new and useful Improvement in Water and Steam Indicators for Steam-Boilers; and I do declare that the following is a full and exact description thereof, reference being had to the accompanying drawings and the letters of reference marked thereon.

The nature of my invention consists in making the glasses concentric, and making their areas differ, so as to give less change to the column indicating the water level, while the column indicating the height of water, shall traverse nearly inch, for inch, with the rise and fall of the water in the boiler, when under pressure, making the change between the two columns identical with the rise and fall of the water in the boiler also in making more or less of the connecting pipes, as virtually to form a compound or double siphon.

To enable others skilled in the art to make and use my invention I shall proceed to describe its construction and operation, reference being had, to the accompanying drawings forming part of this specification in which similar letters in different figures indicate like parts and in which—

Figure 1 is front elevation of boiler, connecting pipe, and indicator (scale one inch to a foot). Fig. 2 is front view of the indicator (scale 3 inches to a foot). Fig. 3 is section through center of water and steam indicator (scale 6 inches to a foot). Fig. 4 is view of the outer concentric glass removed (scale 6 inches to a foot). Fig. 5 is view of the inner concentric glass removed (scale 6 inches to a foot).

$A''$ is case, $B''$ outer concentric glass, $C''$ inner concentric glass, $D''$ is glass float in $C''$ that indicates the rise and fall of water, $e''$ gum elastic tube connecting pipe; $f''$ is small connecting tube of metal inserted in $I''$ forming communication with pipe $S''$, and glass $C''$; $g''$ is gum ring between glass and metal bottom; $h''$ is coupling screw; $i''$ is branch pipe to receive connecting pipes; $J''$, $J''$ is stop screws, and discharge screws; $K''$, $K''$ is stop and coupling cocks; $L''$ is upper cap screw into case $A''$; $M''$ is set screw to make joints; $N''$ is stop ring at head of glass; $O''$ is gum cushion in $N''$ to protect glass $B''$; $P''$ is gum stop to prevent glass float $D''$ from rising out of glass $C''$; $q''$ is gum ring around the head of tube $C''$ as a cushion to prevent its moving; $R''$ and $S''$ are connecting pipes; $T''$ is lower connecting cock to the boiler; $U''$ is the upper connecting cock; $V''$ is the middle connecting pipe between the two down pipes, and is to assume $V''$ to be the water level for the boiler; $W''$ is the boiler; Fig. 1, V red line, is a point fixed for the highest point in the boiler where the water is desired to be carried and is called high water line and represents the line or top of fluid column shown in glass B, and is fixed for the level of the connecting pipe $V''$ connecting the top of pipe S, with the body of pipe $R''$; pipe $R''$ has open communication with the interior of $B''$, through $I°''$, at its bottom; pipe $S''$ has open communications with $C''$ through $e''$ $f''$ and $I°''$ at its bottom; also there are open communications for the passage of air between $B''$ and $C''$ at the top of $C''$; $X''$ $X''$ $X''$ are gage cocks of the usual form.

When the indicator and all its connections are completed and all attachments as shown in Fig. 1, are ready for use then water is put in the boiler in the usual way and tested by the gage cocks where the indicator is elevated above the level, as water must have a pressure to cause it to rise in the tubes and displace the air out of them, after the air is displaced out of the pipes, and sufficient column of water is raised into the tubes by letting the air escape at the screws $J''$ $J''$, a sufficient amount of atmospheric air being left in $B''$ and $C''$ to prevent the column of water by the pressure of steam raising too high into $B''$ and $C''$, this being done, the partial vacuum will support the column in the tubes $B''$ and $C''$, so as to indicate the height of water in the boiler when there is no pressure, providing the column is not too great a height to be supported by the partial vacuum formed in $B''$ and $C''$, but if it is, it will sink out of sight in the lower pipes, and the expanded air fill them, but when pressure is raised or restored then the column of water compresses the air into $B''$ and $C''$, and the water rises till the air is compressed forming an equilibrium of pressure or opposing medium through the open communication between $B''$ and $C''$ at their top; but when it is low enough set it will always indicate the height of water, but in its position as shown in Fig. 1, it will be necessary to raise steam to a sufficient height to support the column of water; when steam is raised the water will rise through the pipes and fill them; when filled they are to be shut by the stop cocks K″ K″, and the stop screws J″ J″ taken out and let the water and air all escape above them. This charges the indicator with its contents of air above the stop screws, but water to fill all the pipes below, and air becomes the opposing medium for the movement of the water columns in the inner and outer concentric glass tubes, and the connecting pipe through, to the boiler; this air becomes compressed just in proportion to the pressure of the steam in the boiler and forms a balancing power to rise or fall with the rise and fall of the water, and carry with it the colored glass float D″ in the inner concentric glass tube, C″ attached to connecting pipe S″ and has open communication from boiler through cock T″ and also has communication with pipe R″ through pipe V″ which is the water level desired or at highest point desired to be carried, leaving sufficient range below it, for, to work the water. This range by the indicator, can be as long as the opening in the indicator. Thus when the steam is up and the water in the boiler is up to the line V″ the two columns of water will be on the same plane or level and the point will indicate the pressure of steam but when the water in the boiler is below the line V″ then the float D″ in C″ will drop below the level of the water column in B as the opposing medium in B and C is air, and open communication from one to the other at their tops, to prevent the column of water filling B″ and C″, with water under the pressure of steam, carried in the boiler; therefore as the water in the boiler falls below the line V″ in the boiler, and connecting pipe V″ between pipes R″ and S″, the water in pipe S″, falls nearly or correspondingly with the water in boiler, less the rise of column in B; pipe R″ is kept up to V″ line and pipe, by condensation and maintains the column in B″ while the surplus passes off through pipe V″, into pipe S″ and finds its level through cock T″ and pipe; therefore as it falls in pipe S″, it must fall in C″, and as C″ is $\frac{1}{6}$ or $\frac{1}{8}$ the area of B″, the column will rise $\frac{1}{6}$ or $\frac{1}{8}$ in B″, while it will fall 6 or 8 times as much in C″, that it has raised in B″, and carries with it float D″, thus dividing the air between the two columns under the same pressure, and as the column in C″, and the water in the boiler rises, the air is displaced out of C″, at its top into B″, and forces the column B″ to fall in order to make room for the compressed air displaced by the rise of water in C″. When cold water is desired to be shown in the instrument, when the instrument is placed at an elevation above the boiler, then it is necessary, to shut the two stop cocks at the boiler, and by any known means, to displace, the air, till the water stands, up about one fourth, or one third, the length of the glass up into glass tubes B″ and C″, then it will always show, the height of water in the boiler, either with, or without pressure, as used on steam vessels, thus giving a higher point in the instrument when pressure is on the boiler, and when no pressure is on the boiler the partial vacuum supports the colunms of water in the indicator; care must be taken when the water elevation becomes too high up in the tubes B″ and C″, that the cocks are shut in the connecting pipes, and the screw or screws J″ removed and a sufficient quantity of the water allowed to escape, and renew the volume of air, for its opposing medium, as the air will in time be absorbed, by the water, and the two columns close, in the instrument, which must be prevented by keeping a sufficient amount of air in it. As their relative areas are to each other, so are the rise of one column to the fall of the other, but in all cases the distance between the level of the two columns is identical with the level of the water below the line V″. B″ has its open communication with the boiler through connecting pipe R″ and by cock U″ and also V″ and T″ where the column of water is kept up by condensation in pipe R″ up to V″ all the surplus passing off through V″ into S″, and flowing off into the boiler through cock T″.

Thus having shown the manner I have constructed and manner in which I operate my improvement in water and steam indicators. What I claim and desire to secure by Letters-Patent is—

The manner of constructing and arranging the concentric glasses and connecting tubes, as, and for the purpose herein set forth.

WM. C. GRIMES.

Witnesses:
CHARLES D. FREEMAN,
WM. H. PERPIGNEN.